(12) United States Patent
Yoo

(10) Patent No.: US 11,748,593 B2
(45) Date of Patent: Sep. 5, 2023

(54) SENSOR FUSION TARGET PREDICTION DEVICE AND METHOD FOR VEHICLES AND VEHICLE INCLUDING THE DEVICE

(71) Applicants: HYUNDAI MOTOR COMPANY, Seoul (KR); KIA MOTORS CORPORATION, Seoul (KR)

(72) Inventor: Min Kyun Yoo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 796 days.

(21) Appl. No.: 16/525,973

(22) Filed: Jul. 30, 2019

(65) Prior Publication Data

US 2020/0180646 A1     Jun. 11, 2020

(30) Foreign Application Priority Data

Dec. 5, 2018 (KR) .................. 10-2018-0155005

(51) Int. Cl.
*G06N 3/04*     (2023.01)
*G05B 13/02*    (2006.01)

(52) U.S. Cl.
CPC ............. *G06N 3/04* (2013.01); *G05B 13/027* (2013.01)

(58) Field of Classification Search
CPC .............................. G06N 3/04; G05B 13/027
See application file for complete search history.

(56) References Cited

U.S. PATENT DOCUMENTS

| | | | |
|---|---|---|---|
| 2011/0137831 A1* | 6/2011 | Ide | G06N 20/00 |
| | | | 706/12 |
| 2017/0206464 A1 | 7/2017 | Clayton et al. | |
| 2017/0278321 A1 | 9/2017 | Nishida et al. | |
| 2018/0053108 A1 | 2/2018 | Olabiyi et al. | |
| 2019/0050729 A1* | 2/2019 | Lakshmanan | G06N 3/063 |
| 2019/0391578 A1* | 12/2019 | Tariq | G06V 20/58 |

FOREIGN PATENT DOCUMENTS

| | | | | |
|---|---|---|---|---|
| CN | 109829386 A | * | 5/2019 | |
| EP | 3726429 A1 | * | 10/2020 | G06F 17/16 |
| JP | 2007-091104 A | | 4/2007 | |
| JP | 5063851 B2 | | 10/2012 | |

(Continued)

*Primary Examiner* — Behrang Badii
*Assistant Examiner* — Jay Khandpur
(74) *Attorney, Agent, or Firm* — Fox Rothschild LLP

(57) ABSTRACT

A sensor fusion target prediction device and method for vehicles that can estimate a prediction value in the state in which no current measurement value is present, and a vehicle including the device are disclosed. The sensor fusion target prediction device may include a learning unit for receiving sensor fusion target information and learning one or more parameters based on the received sensor fusion target information, a prediction unit for, upon receiving current sensor fusion target information, calculating a prediction value of the current sensor fusion target information based on the one or more parameters learned by the learning unit, and a target tracking unit for determining whether the sensor fusion target information is received and tracking a target using the prediction value calculated by the prediction unit based on not receiving the sensor fusion target information.

14 Claims, 6 Drawing Sheets

(56) References Cited

FOREIGN PATENT DOCUMENTS

| | | | |
|---|---|---|---|
| JP | 2017-174244 A | 9/2017 | |
| JP | 2018-173816 A | 11/2018 | |
| KR | 10-2017-0074539 A | 6/2017 | |
| KR | 10-2017-0114054 A | 10/2017 | |
| KR | 10-2017-0117723 A | 10/2017 | |
| KR | 2017117723 A * | 10/2017 | ............... B63G 1/00 |
| KR | 10-2018-0029543 A | 3/2018 | |
| KR | 2019048597 A * | 5/2019 | ............... G06N 3/04 |

* cited by examiner ured to provide further explanation of the embodiments
SENSOR FUSION TARGET PREDICTION DEVICE AND METHOD FOR VEHICLES AND VEHICLE INCLUDING THE DEVICE This application claims the benefit of Korean Patent Application No. 10-2018-0155005, filed on Dec. 5, 2018, which is hereby incorporated by reference as if fully set forth herein.

BACKGROUND

Field

The present disclosure relates to a sensor fusion target prediction device for vehicles, and more particularly to a sensor fusion target prediction device and method for vehicles that are capable of estimating a prediction value in the state in which no current measurement value is present, thereby minimizing an error in the determination of the position of a sensor fusion target, and a vehicle including the device.

Discussion of the Related Art

In general, a vehicle is equipped with various systems for protecting a driver and passengers, assisting the driver, and improving ride comfort. These systems have been improved and developed through utilization of various sensors and information communication technology.

Among them, technology for recognizing a lane and performing automatic steering using a camera-based image sensor has been put to practical use.

An image recognition and processing device provided in a vehicle may detect image information about a lane of a road on which the vehicle travels, image information about a rear vehicle, and image information about lanes to the left and right, and may display the detected image information through a display means in order to enable a driver to conveniently recognize the lanes and to inform the driver of the situation of the road on which the vehicle travels and information about travel of adjacent vehicles.

SUMMARY

Accordingly, the present disclosure is directed to a sensor fusion target prediction device and method for vehicles and a vehicle including the device that substantially obviate one or more problems due to limitations and disadvantages of the related art.

Aspects of the present disclosure provide a sensor fusion target prediction device and method for vehicles capable of calculating a prediction value of the current sensor fusion target information based on parameters learned by a learning unit, whereby it is possible to improve the reliability of the prediction value and to minimize an error in the prediction value, and a vehicle including the device.

Aspects of the present disclosure devised to solve the problems and the advantages thereof are not limited to those described herein, and other aspects and advantages will be clearly understood by those skilled in the art based on the following detailed description of the present disclosure.

In one aspect of the present disclosure, a sensor fusion target prediction device for vehicles includes a learning unit for receiving and learning sensor fusion target information, a prediction unit for, upon receiving current sensor fusion target information, calculating a prediction value of the current sensor fusion target information based on parameters learned by the learning unit, and a target tracking unit for checking whether the sensor fusion target information is received and tracking a target using the prediction value calculated by the prediction unit when not receiving the sensor fusion target information. As described herein, in some embodiments, "learning" particular information may include determining, calculating, generating, extracting, updating, or improving one or more parameters or models based on the particular information (or a portion thereof). Alternatively or additionally, in some embodiments, "learning" particular information may include determining, calculating, generating, extracting, updating, or improving the particular information (or a portion thereof).

In another aspect of the present disclosure, a sensor fusion target prediction method for vehicles includes receiving sensor fusion target information, learning the received sensor fusion target information, calculating a prediction value of the current sensor fusion target information based on the learned parameters, checking whether the sensor fusion target information is received, and tracking a target using the calculated prediction value when not receiving the sensor fusion target information.

In another aspect of the present disclosure, a computer-readable recording medium containing a program for performing the sensor fusion target prediction method executes processes included in the sensor fusion target prediction method.

In a further aspect of the present disclosure, a vehicle includes a sensor fusion device for sensing the behavior of a target and a sensor fusion target prediction device connected to the sensor fusion device through communication for predicting the behavior of the target, wherein the sensor fusion target prediction device includes a learning unit for receiving and learning sensor fusion target information, a prediction unit for, upon receiving current sensor fusion target information, calculating a prediction value of the current sensor fusion target information based on parameters learned by the learning unit, and a target tracking unit for checking whether the sensor fusion target information is received and tracking a target using the prediction value calculated by the prediction unit when not receiving the sensor fusion target information.

It is to be understood that both the foregoing general description and the following detailed description of the present disclosure are exemplary and explanatory and are intended to provide further explanation of the embodiments in the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
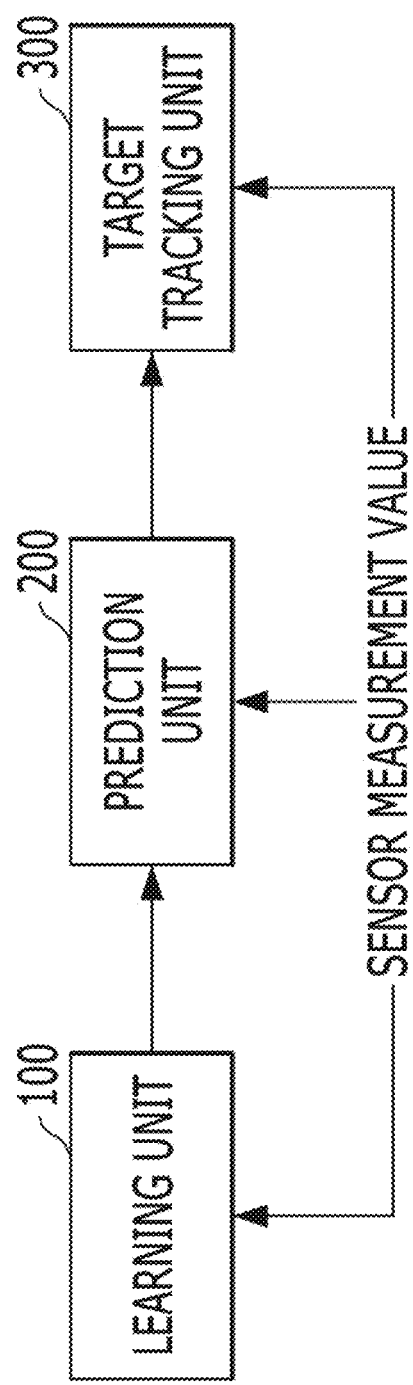
FIG. 1 is a block diagram illustrating a sensor fusion target prediction device for vehicles according to an embodiment of the present disclosure.

Reference will now be made in detail to the preferred embodiments of the present disclosure, examples of which are illustrated in the accompanying drawings. The following embodiments are given by way of example in order to enable those skilled in the art to fully understand the idea of the present disclosure. Therefore, the present disclosure is not limited by the following embodiments, and may be realized in various other forms. In order to clearly describe embodiments in the present disclosure, parts having no relation with the description of the present disclosure have been omitted from the drawings. Wherever possible, the same reference numerals will be used throughout the specification to refer to the same or like parts.

The term "comprises" or "includes" used herein should be interpreted not to exclude other elements but to further include such other elements, unless mentioned otherwise. In addition, the term "unit" or "module" used herein signifies one unit that processes at least one function or operation, and may be realized by hardware, software, or a combination thereof.

In recent years, a sensor fusion system capable of fusing image information and radar information collected through an image sensor and radar, respectively, in order to extract and use necessary information has been developed.

Such a sensor fusion system is used to provide an autonomous traveling system that recognizes lane information and controls automatic steering of a vehicle using a camera or a smart cruise control function of the vehicle.

However, the sensor fusion system may create a dangerous situation in the case in which, during tracking of a sensor fusion target, the sensor fusion target that is being tracked is not sensed due to the malfunction of a sensor or as the result of the sensor fusion target that is being tracked being hidden by another sensor fusion target.

Even in the case in which the sensor fusion target being tracked is not sensed due to the malfunction of the sensor or as the result of the sensor fusion target being tracked being hidden by another sensor fusion target, therefore, the sensor fusion system may need to maintain the sensor fusion target for a predetermined time. Since no current measurement value measured by the sensor is present at that time, however, information of the sensor fusion target may be updated through prediction.

The sensor fusion system may predict the sensor fusion target using a filter. For example, the sensor fusion system may predict subsequent behavior of the sensor fusion target using a uniform velocity/acceleration model.

When no measurement value measured by the sensor is present, however, the sensor fusion system may contain an error in the prediction value of the position of the target.

Particularly, in the case in which a road is curved, a prediction value may be calculated without considering the fact that the road is curved. As a result, information about the curved section of the road may be reflected in a prediction position, whereby a position error in the prediction value on an actual road may be increased.

Therefore, there is a need to develop a sensor fusion target prediction device for vehicles that is capable of improving the reliability of a prediction value of a target and minimizing an error in the prediction value.

Hereinafter, a sensor fusion target prediction device and method for vehicles and a vehicle including the device, which may be applied to embodiments of the present disclosure, will be described in detail with reference to FIGS. 1 to 6.

FIG. 1 is a block diagram illustrating a sensor fusion target prediction device for vehicles according to an embodiment of the present disclosure.

As shown in FIG. 1, the sensor fusion target prediction device may include a learning unit 100, a prediction unit 200, and a target tracking unit 300.

The learning unit 100 may receive and learn sensor fusion target information.

Upon receiving the sensor fusion target information, the learning unit 100 may receive at least one of lateral velocity information, longitudinal velocity information, lateral position information, longitudinal position information, heading angle information, or longitudinal acceleration information of a target, yaw rate information of a host vehicle, or curvature information of a road.

The learning unit 100 may receive the curvature information of the road from a front camera of the host vehicle.

Upon receiving the sensor fusion target information, the learning unit 100 may sort the received sensor fusion target information into learning items, and may continuously learn information corresponding to each learning item according to the point of measurement time.

When sorting the received sensor fusion target information into the learning items, the learning unit 100 may sort the sensor fusion target information into a first learning item for learning the lateral velocity information, a second learning item for learning the longitudinal velocity information, a third learning item for learning the lateral position information, a fourth learning item for learning the longitudinal position information, a fifth learning item for learning the heading angle information, a sixth learning item for learning the longitudinal acceleration information, a seventh learning item for learning the yaw rate information of the host vehicle, and an eighth learning item for learning the curvature information of the road.

In addition, when continuously learning information corresponding to each learning item according to the point of measurement time, the learning unit 100 may accumulate information corresponding to each learning item at every point of measurement time, and may continuously learn the information.

When accumulating information corresponding to each learning item at every point of measurement time and continuously learning the information, the learning unit 100 may accumulate a plurality of pieces of information measured from the current point of measurement time t to the past points of measurement time t−1 to t−n (n being a natural number), and may learn the information.

For example, when accumulating information corresponding to each learning item at every point of measurement time and continuously learning the information, the learning unit 100 may accumulate ten pieces of information measured from the current point of measurement time t to the past points of measurement time t−1 to t−9, and may learn the information. As another example, the learning unit 100 may accumulate any other number n1 (e.g., 2, 3, 4, . . . ) of pieces of information measured from the current point of measurement time t to the past points of measurement time t−1 to t−n1, and may learn the information.

When continuously learning information corresponding to each learning item according to the point of measurement time, the learning unit 100 may perform learning based on a recurrent neural network (RNN) learning method.

Upon receiving the current sensor fusion target information, the prediction unit 200 may calculate a prediction value of the current sensor fusion target information based on parameters learned by the learning unit 100.

Upon receiving the current sensor fusion target information, the prediction unit 200 may sort the received current sensor fusion target information into prediction items, may receive learning information corresponding to each prediction item from the learning unit, and may calculate a first prediction value of the next point of measurement time t+1 after the current point of measurement time t based on the received learning information.

When sorting the received current sensor fusion target information into prediction items, the prediction unit 200 may sort the sensor fusion target information into a first prediction item for predicting the lateral velocity information, a second prediction item for predicting the longitudinal velocity information, a third prediction item for predicting the lateral position information, a fourth prediction item for predicting the longitudinal position information, a fifth prediction item for predicting the heading angle information, a sixth prediction item for predicting the longitudinal acceleration information, a seventh prediction item for predicting the yaw rate information of the host vehicle, and an eighth prediction item for predicting the curvature information of the road.

When receiving learning information corresponding to each prediction item from the learning unit 100, the prediction unit 200 may receive learning information acquired by accumulating and learning a plurality of pieces of information measured from the current point of measurement time t to the past points of measurement time t−1 to t−n (n being a natural number).

For example, when receiving learning information corresponding to each prediction item from the learning unit 100, the prediction unit 200 may receive learning information acquired by accumulating and learning ten pieces of information measured from the current point of measurement time t to the past points of measurement time t−1 to t−9. As another example, the prediction unit 200 may receive learning information acquired by accumulating and learning any other number n1 (e.g., 2, 3, 4, . . . ) of pieces of information measured from the current point of measurement time t to the past points of measurement time t−1 to t−n1.

When calculating the first prediction value, the prediction unit 200 may calculate the first prediction value corresponding to each sorted prediction item.

Upon calculating the first prediction value of the next point of measurement time t+1 after the current point of measurement time t, the prediction unit 200 may calculate a second prediction value of the next point of measurement time t+2 based on the calculated first prediction value and learning information corresponding to the first prediction value.

Here, the learning information corresponding to the first prediction value may be learning information including information measured from the current point of measurement time t to the past points of measurement time t−1 to t−n (n being a natural number).

For example, the learning information corresponding to the first prediction value may be learning information including nine pieces of information measured from the current point of measurement time t to the past points of measurement time t−1 to t−8.

When calculating the second prediction value, the prediction unit 200 may calculate the second prediction value of the next point of measurement time t+2 when (or based on) not receiving the current sensor fusion target information after calculating the first prediction value.

When calculating the second prediction value, the prediction unit 200 may calculate the second prediction value of the next point of measurement time t+2 when (or based on) not continuously receiving the current sensor fusion target information at the next points of measurement time t+1 and t+2 after the current point of measurement time t after calculating the first prediction value.

The target tracking unit 300 may check whether the sensor fusion target information is received, and may track a target using the prediction value calculated by the prediction unit 200 when (or based on) not receiving the sensor fusion target information.

When checking whether the sensor fusion target information is received, the target tracking unit 300 may track the target based on the sensor fusion target information upon receiving the sensor fusion target information.

In the present disclosure, as described above, it is possible to calculate the prediction value of the current sensor fusion target information based on the parameters learned by the learning unit, whereby it is possible to improve the reliability of the prediction value and to minimize an error in the prediction value.

For example, a conventional prediction value selection method uses only the previous velocity/acceleration of a target. In the present disclosure, however, the transition of past steps is checked through a recurrent neural network (RNN), and the value of the next step is predicted, whereby it is possible to improve the accuracy of the prediction value by checking the transition of past steps, unlike the case in which only the previous step is used.

In the present disclosure, as described above, it is possible to estimate the prediction value using the RNN when no current measurement value is present (or based on no current measurement value being present) and to determine reliability, whereby it is possible to minimize an error in the determination of the position of a sensor fusion target compared to the actual position thereof.

Figure 2:
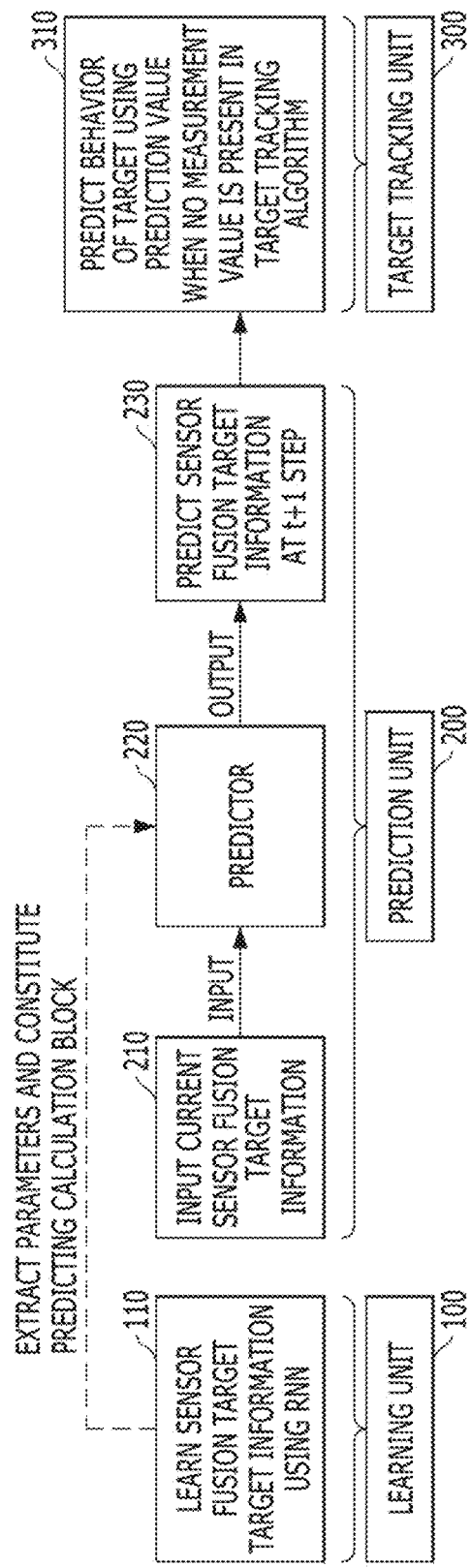
FIG. 2 is a view illustrating a sensor fusion target prediction process in FIG. 1.
Figure 3:
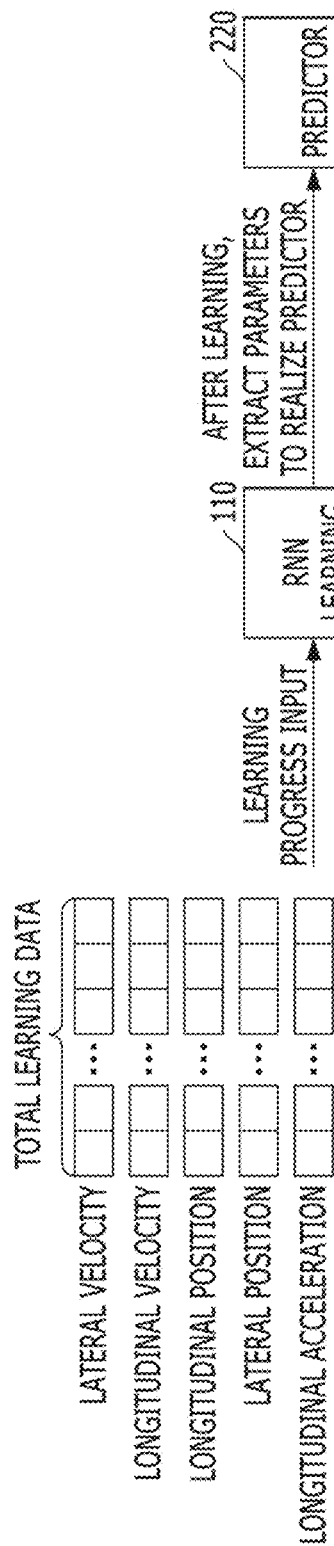
FIG. 3 is a view illustrating a learning process in FIG. 2.
Figure 4:
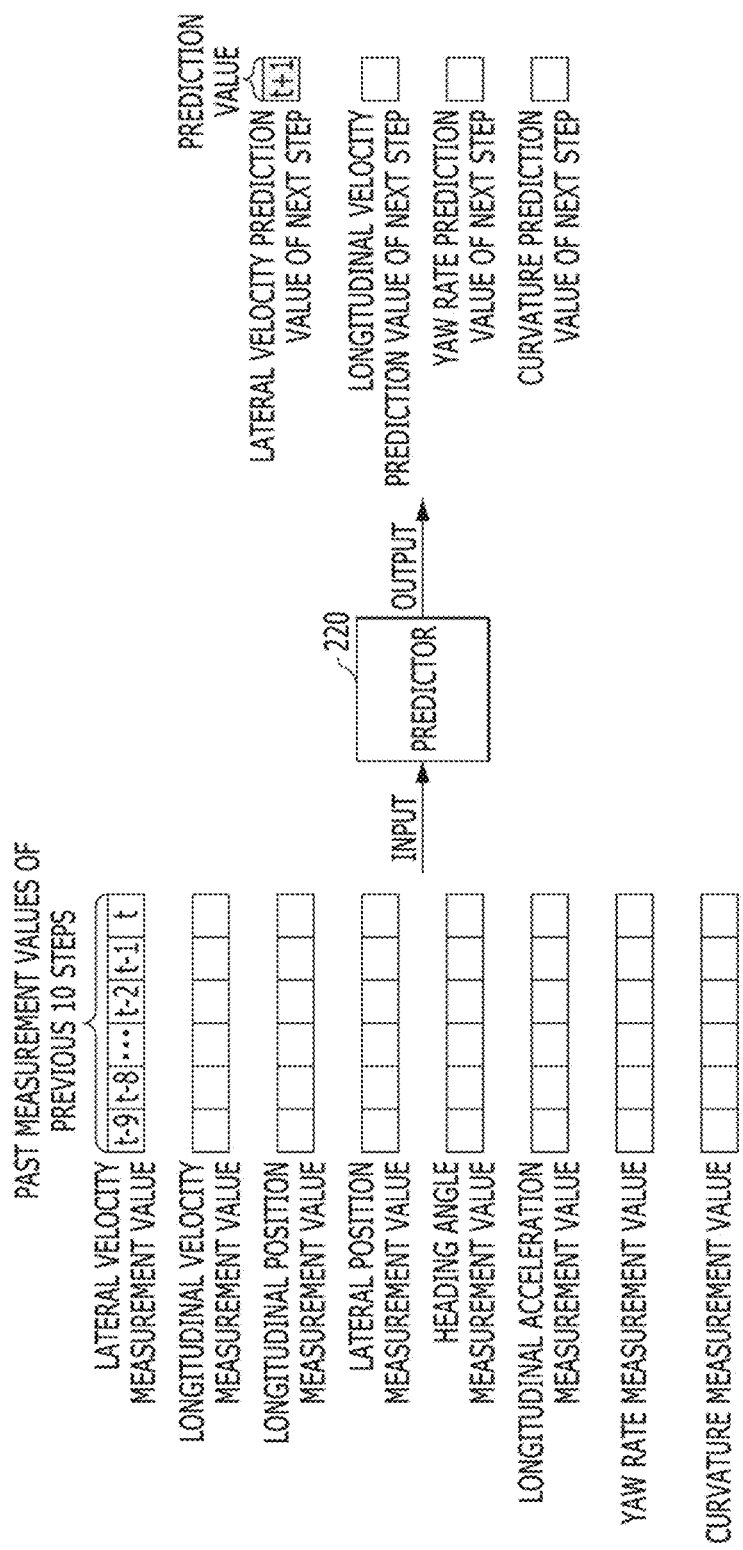
FIGS. 4 and 5 are views illustrating a prediction process in FIG. 2.
Figure 5:
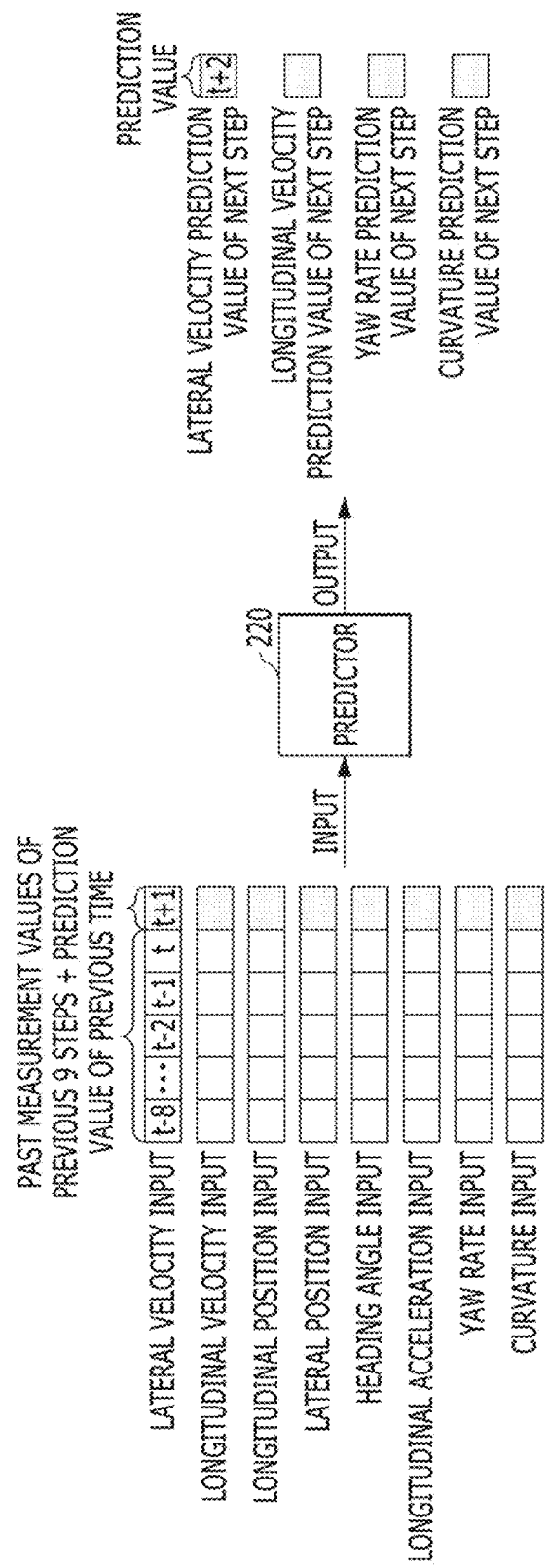

FIG. 2 is a view illustrating a sensor fusion target prediction process in FIG. 1, FIG. 3 is a view illustrating a learning process in FIG. 2, and FIGS. 4 and 5 are views illustrating a prediction process in FIG. 2.

As shown in FIGS. 2 and 3, the learning unit 100 may receive and learn sensor fusion target information.

For example, the learning unit 100 may learn the lateral/longitudinal position, the lateral/longitudinal velocity, the longitudinal acceleration, and the heading angle of a sensor fusion target, the yaw rate of a host vehicle, and curvature information of a road at the past ten steps using the recurrent neural network (RNN) (110).

In addition, the learning unit 100 may receive sensor fusion target information including at least one of lateral velocity information, longitudinal velocity information, lateral position information, longitudinal position information, heading angle information, or longitudinal acceleration information of a target, yaw rate information of a host vehicle, or curvature information of a road.

At this time, the learning unit 100 may receive the curvature information of the road from the front camera of the host vehicle.

Upon receiving the sensor fusion target information, the learning unit 100 may sort the received sensor fusion target information into learning items, and may continuously learn information corresponding to each learning item according to the point of measurement time (110).

When sorting the received sensor fusion target information into the learning items, the learning unit 100 may sort the sensor fusion target information into a first learning item for learning the lateral velocity information, a second learning item for learning the longitudinal velocity information, a third learning item for learning the lateral position information, a fourth learning item for learning the longitudinal position information, a fifth learning item for learning the heading angle information, a sixth learning item for learning the longitudinal acceleration information, a seventh learning item for learning the yaw rate information of the host vehicle, and an eighth learning item for learning the curvature information of the road.

In addition, when continuously learning information corresponding to each learning item according to the point of measurement time, the learning unit 100 may accumulate information corresponding to each learning item at every point of measurement time, and may continuously learn the information.

When accumulating information corresponding to each learning item at every point of measurement time and continuously learning the information, the learning unit 100 may accumulate a plurality of pieces of information measured from the current point of measurement time t to the past points of measurement time t−1 to t−n (n being a natural number), and may learn the information.

For example, when accumulating information corresponding to each learning item at every point of measurement time and continuously learning the information, the learning unit 100 may accumulate ten pieces of information measured from the current point of measurement time t to the past points of measurement time t−1 to t−9, and may learn the information.

When continuously learning information corresponding to each learning item according to the point of measurement time, the learning unit 100 may perform learning based on the recurrent neural network (RNN) learning method.

As described above, the learning unit 100 may learn the lateral/longitudinal position, the lateral/longitudinal velocity, the longitudinal acceleration, and the heading angle of the sensor fusion target, the yaw rate of the host vehicle, and curvature information of a sensor of the front camera using the RNN, and, when learning has been performed, may set a parameter learned based on data at the past ten steps of the sensor fusion target, among the inner parameters of the RNN.

As shown in FIGS. 2, 4, and 5, upon receiving the current sensor fusion target information, the prediction unit 200 may calculate a prediction value of the current sensor fusion target information based on parameters learned by the learning unit 100.

For example, the prediction unit 200 may output a prediction value by inputting the lateral/longitudinal velocity, the longitudinal acceleration, and the heading angle of the current sensor fusion target, the yaw rate of the host vehicle, and/or the curvature of the sensor of the front camera based on the parameters learned by the learning unit.

The prediction unit 200 may receive the current sensor fusion target information including the lateral/longitudinal position, the lateral/longitudinal velocity, the longitudinal acceleration, and the heading angle of the target, the yaw rate of the host vehicle, and/or the curvature information of the road (210).

Upon receiving the current sensor fusion target information, the prediction unit 200 may sort the received current sensor fusion target information into prediction items, may receive learning information corresponding to each prediction item from the learning unit, and may calculate a first prediction value of the next point of measurement time t+1 after the current point of measurement time t based on the received learning information (220 and 230).

For example, the prediction unit 200 may input measurement values at the past ten steps to a predictor in order to acquire a prediction value of the next step as an output.

When sorting the received current sensor fusion target information into prediction items, the prediction unit 200 may sort the sensor fusion target information into a first prediction item for predicting the lateral velocity information, a second prediction item for predicting the longitudinal velocity information, a third prediction item for predicting the lateral position information, a fourth prediction item for predicting the longitudinal position information, a fifth prediction item for predicting the heading angle information, a sixth prediction item for predicting the longitudinal acceleration information, a seventh prediction item for predicting the yaw rate information of the host vehicle, and an eighth prediction item for predicting the curvature information of the road.

When receiving learning information corresponding to each prediction item from the learning unit 100, the prediction unit 200 may receive learning information acquired by accumulating and learning a plurality of pieces of information measured from the current point of measurement time t to the past points of measurement time t−1 to t−n (n being a natural number).

For example, when receiving learning information corresponding to each prediction item from the learning unit 100, the prediction unit 200 may receive learning information acquired by accumulating and learning ten pieces of information measured from the current point of measurement time t to the past points of measurement time t−1 to t−9.

When calculating the first prediction value, the prediction unit 200 may calculate the first prediction value corresponding to each sorted prediction item.

Upon calculating the first prediction value of the next point of measurement time t+1 after the current point of measurement time t, the prediction unit 200 may calculate a second prediction value of the next point of measurement time t+2 based on the calculated first prediction value and learning information corresponding to the first prediction value.

For example, in the case in which no measurement value measured by the sensor is present at two or more steps, the prediction unit 200 may predict the next point of measurement time using the prediction value predicted at the previous point of measurement time and data at the previous nine steps as an input.

Here, the learning information corresponding to the first prediction value may be learning information including information measured from the current point of measurement time t to the past points of measurement time t−1 to t−n (n being a natural number).

For example, the learning information corresponding to the first prediction value may be learning information including nine pieces of information measured from the current point of measurement time t to the past points of measurement time t−1 to t−8.

When calculating the second prediction value, the prediction unit 200 may calculate the second prediction value of the next point of measurement time t+2 when (or based on) not receiving the current sensor fusion target information after calculating the first prediction value.

When calculating the second prediction value, the prediction unit 200 may calculate the second prediction value of the next point of measurement time t+2 when (or based on) not continuously receiving the current sensor fusion target information at the next points of measurement time t+1 and t+2 after the current point of measurement time t after calculating the first prediction value.

Figure 6:
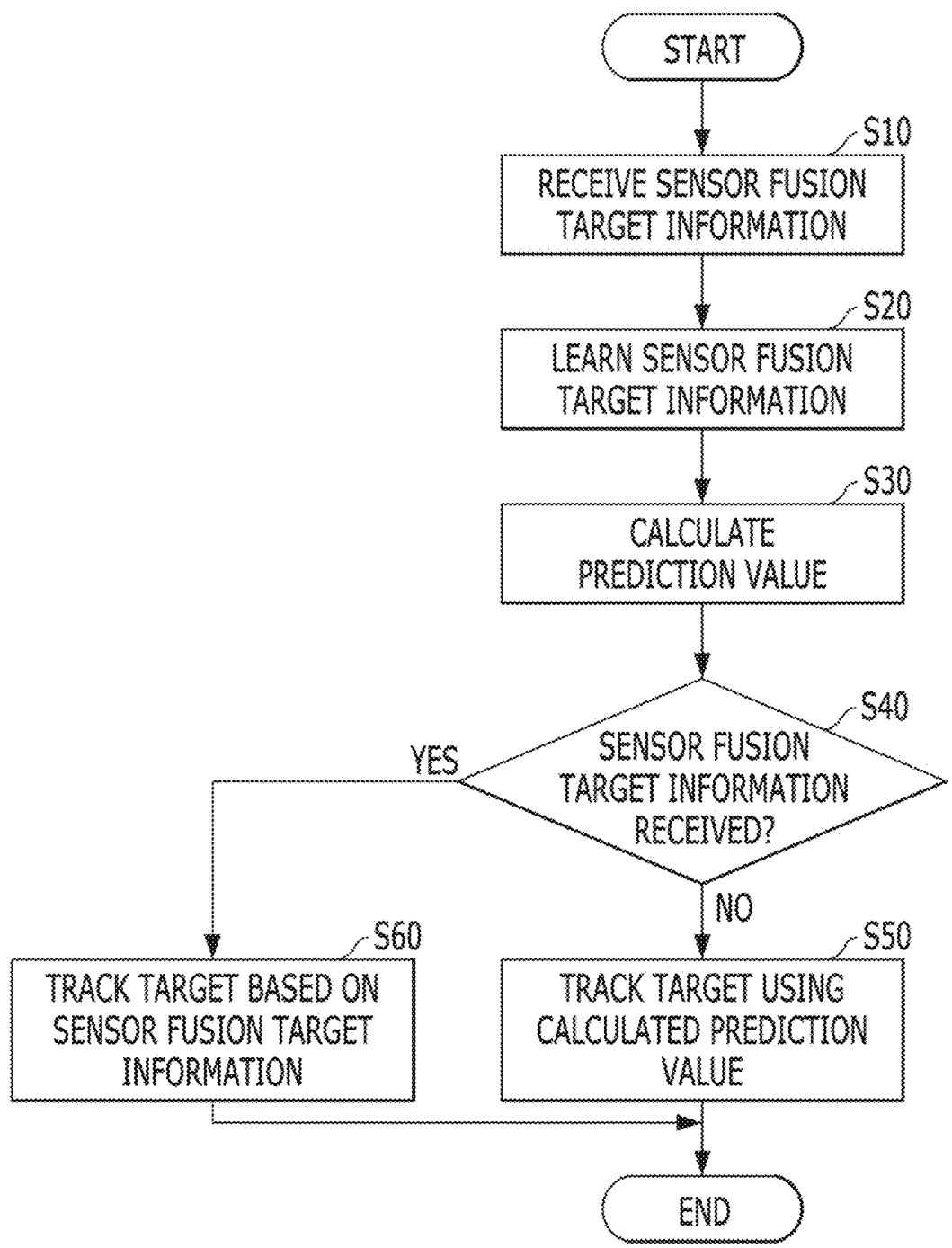
FIG. 6 is a flowchart illustrating a sensor fusion target prediction method according to an embodiment of the present disclosure.

FIG. 6 is a flowchart illustrating a sensor fusion target prediction method according to an embodiment of the present disclosure.

As shown in FIG. 6, sensor fusion target information may be received (S10).

Sensor fusion target information including at least one of lateral velocity information, longitudinal velocity information, lateral position information, longitudinal position information, heading angle information, or longitudinal acceleration information of a target, yaw rate information of a host vehicle, or curvature information of a road may be received.

Subsequently, the received sensor fusion target information may be learned (S20).

The step of learning the received sensor fusion target information may include sorting the received sensor fusion target information into learning items and continuously learning information corresponding to each learning item according to the point of measurement time.

At the step of sorting the received sensor fusion target information into the learning items, the sensor fusion target information may be sorted into a first learning item for learning the lateral velocity information, a second learning item for learning the longitudinal velocity information, a third learning item for learning the lateral position information, a fourth learning item for learning the longitudinal position information, a fifth learning item for learning the heading angle information, a sixth learning item for learning the longitudinal acceleration information, a seventh learning item for learning the yaw rate information of the host vehicle, and an eighth learning item for learning the curvature information of the road.

In addition, at the step of continuously learning information corresponding to each learning item according to the point of measurement time, information corresponding to each learning item may be accumulated at every point of measurement time, and may then be continuously learned.

For example, at the step of continuously learning information corresponding to each learning item according to the point of measurement time, a plurality of pieces of information measured from the current point of measurement time t to the past points of measurement time t−1 to t−n (n being a natural number) may be accumulated and learned.

For example, at the step of continuously learning information corresponding to each learning item according to the point of measurement time, ten pieces of information measured from the current point of measurement time t to the past points of measurement time t−1 to t−9 may be accumulated and learned.

For example, at the step of continuously learning information corresponding to each learning item according to the point of measurement time, learning may be performed based on the recurrent neural network (RNN) learning method.

Subsequently, a prediction value of the current sensor fusion target information may be calculated based on the learned parameters (S30).

The step of calculating the prediction value of the current sensor fusion target information may include receiving the current sensor fusion target information, sorting the received current sensor fusion target information into prediction items, receiving learning information corresponding to each prediction item, and calculating a first prediction value of the next point of measurement time t+1 after the current point of measurement time t based on the received learning information.

At the step of sorting the received current sensor fusion target information into prediction items, the sensor fusion target information may be sorted into a first prediction item for predicting the lateral velocity information, a second prediction item for predicting the longitudinal velocity information, a third prediction item for predicting the lateral position information, a fourth prediction item for predicting the longitudinal position information, a fifth prediction item for predicting the heading angle information, a sixth prediction item for predicting the longitudinal acceleration information, a seventh prediction item for predicting the yaw rate information of the host vehicle, and an eighth prediction item for predicting the curvature information of the road.

At the step of receiving learning information corresponding to each prediction item, learning information acquired by accumulating and learning a plurality of pieces of information measured from the current point of measurement time t to the past points of measurement time t−1 to t−n (n being a natural number) may be received.

For example, at the step of receiving learning information corresponding to each prediction item, learning information acquired by accumulating and learning ten pieces of information measured from the current point of measurement time t to the past points of measurement time t−1 to t−9 may be received.

At the step of calculating the first prediction value, the first prediction value corresponding to each sorted prediction item may be calculated.

In addition, the step of calculating the first prediction value may further include, upon calculating the first prediction value of the next point of measurement time t+1 after the current point of measurement time t, calculating a second prediction value of the next point of measurement time t+2 based on the calculated first prediction value and learning information corresponding to the first prediction value.

Here, the learning information corresponding to the first prediction value may be learning information including information measured from the current point of measurement time t to the past points of measurement time t−1 to t−n (n being a natural number).

For example, the learning information corresponding to the first prediction value may be learning information including nine pieces of information measured from the current point of measurement time t to the past points of measurement time t−1 to t−8.

At the step of calculating the second prediction value, the second prediction value of the next point of measurement time t+2 may be calculated when (or based on) not receiving the current sensor fusion target information after calculating the first prediction value.

For example, at the step of calculating the second prediction value, the second prediction value of the next point of measurement time t+2 may be calculated when (or based on) not continuously receiving the current sensor fusion target information at the next points of measurement time t+1 and t+2 after the current point of measurement time t after calculating the first prediction value.

Subsequently, whether the sensor fusion target information is received may be checked (S40).

When (or based on) not receiving the sensor fusion target information, a target may be tracked using the calculated prediction value (S50).

In addition, at the step of checking whether the sensor fusion target information is received, the target may be tracked based on the sensor fusion target information upon receiving the sensor fusion target information (S60).

In addition, a computer-readable recording medium containing a program for performing the sensor fusion target prediction method according to the present disclosure may execute the processes included in the sensor fusion target prediction method.

Meanwhile, a vehicle according to an embodiment of the present disclosure may include a sensor fusion device for sensing the behavior of a target and a sensor fusion target prediction device connected to the sensor fusion device through communication for predicting the behavior of the target, wherein the sensor fusion target prediction device may include a learning unit for receiving and learning sensor fusion target information, a prediction unit for, upon receiving the current sensor fusion target information, calculating a prediction value of the current sensor fusion target information based on parameters learned by the learning unit, and a target tracking unit for checking whether the sensor fusion target information is received and tracking a target using the prediction value calculated by the prediction unit when (or based on) not receiving the sensor fusion target information.

In the present disclosure, as described above, it is possible to calculate the prediction value of the current sensor fusion target information based on the parameters learned by the learning unit, whereby it is possible to improve the reliability of the prediction value and to minimize an error in the prediction value.

For example, a conventional prediction value selection method uses only the previous velocity/acceleration of a target. In the present disclosure, however, the transition of past steps is checked through a recurrent neural network (RNN), and the value of the next step is predicted, whereby it is possible to improve the accuracy of the prediction value by checking the transition of past steps, unlike the case in which only the previous step is used.

In the present disclosure, as described above, it is possible to estimate the prediction value using the RNN when no current measurement value is present (or based on no current measurement value being present) and to determine reliability, whereby it is possible to minimize an error in the determination of the position of a sensor fusion target compared to the actual position thereof.

The sensor fusion target prediction method according to the present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device, as well as implementation as carrier waves (e.g., transmission over the Internet).

As is apparent from the above description, the sensor fusion target prediction device and method for vehicles and the vehicle including the device according to at least one embodiment of the present disclosure are capable of calculating the prediction value of the current sensor fusion target information based on the parameters learned by the learning unit, whereby it is possible to improve the reliability of the prediction value and to minimize an error in the prediction value.

For example, a conventional prediction value selection method uses only the previous velocity/acceleration of a target. In the present disclosure, however, the transition of past steps is checked through a recurrent neural network (RNN), and the value of the next step is predicted, whereby it is possible to improve the accuracy of the prediction value by checking the transition of past steps, unlike the case in which only the previous step is used.

In the present disclosure, as described above, it is possible to estimate the prediction value using the RNN when no current measurement value is present (or based on no current measurement value being present) and to determine reliability, whereby it is possible to minimize an error in the determination of the position of a sensor fusion target compared to the actual position thereof.

It will be appreciated by those skilled in the art that the effects achievable through the present disclosure are not limited to those that have been particularly described hereinabove and that other effects of the present disclosure will be more clearly understood from the above detailed description.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood to be included in the following claims.

What is claimed is:

1. A sensor fusion target prediction device for vehicles, the sensor fusion target prediction device comprising:
   a learning unit configured to receive sensor fusion target information and learn one or more parameters based on the received sensor fusion target information;
   a prediction unit configured to, upon receiving current sensor fusion target information at a current point of measurement time t, calculate a prediction value for a next time-point sensor fusion target information at a next point of measurement time t+1 based on the current sensor fusion target information and the one or more parameters learned by the learning unit; and
   a target tracking unit configured to:
      determine whether the next time-point sensor fusion target information is received;
      track a target using the prediction value calculated by the prediction unit based on not receiving the next time-point sensor fusion target information; and
      track the target based on the next time-point sensor fusion target information upon receiving the next time-point sensor fusion target information.

2. The sensor fusion target prediction device according to claim 1, wherein, upon receiving the current sensor fusion target information, the prediction unit is configured to sort the received current sensor fusion target information into prediction items, receive learning information corresponding to each prediction item from the learning unit, and calculate a first prediction value.

3. The sensor fusion target prediction device according to claim 2, wherein the prediction unit is configured to receive learning information acquired by accumulating and learning ten pieces of information measured from the current point of measurement time t to past points of measurement time t−1 to t−9.

4. The sensor fusion target prediction device according to claim 2, wherein, upon calculating the first prediction value of the next point of measurement time t+1 after the current point of measurement time t, the prediction unit is configured to calculate a second prediction value for a next-next time-point sensor fusion target information based on the calculated first prediction value and learning information corresponding to the first prediction value.

5. The sensor fusion target prediction device according to claim 4, wherein the learning information corresponding to the first prediction value is learning information comprising nine pieces of information measured from the current point of measurement time t to past points of measurement time t−1 to t−8.

6. The sensor fusion target prediction device according to claim 4, wherein the prediction unit is configured to calculate the second prediction value for the next-next time-point sensor fusion target information based on not receiving the next-next time point sensor fusion target information after calculating the first prediction value.

7. The sensor fusion target prediction device according to claim 4, wherein the prediction unit is configured to calculate the second prediction value for the next-next time point sensor fusion target information based on not continuously receiving the current sensor fusion target information and the next time-point sensor fusion target information.

8. A sensor fusion target prediction method for vehicles, the sensor fusion target prediction method comprising:
　receiving a current sensor fusion target information of a current point of measurement time t;
　learning one or more parameters based on the received sensor fusion target information;
　calculating a prediction value for a next time-point sensor fusion target information at a next point of measurement time t+1 based on the one or more learned parameters;
　determining whether the next time-point sensor fusion target information is received; and
　tracking a target using the calculated prediction value based on not receiving the next time-point sensor fusion target information, and tracking the target based on the next time-point sensor fusion target information upon receiving the next time-point sensor fusion target information.

9. The sensor fusion target prediction method according to claim 8, wherein the step of calculating the prediction value for the next time-point sensor fusion target information comprises:
　receiving the current sensor fusion target information;
　sorting the received current sensor fusion target information into prediction items;
　receiving learning information corresponding to each prediction item; and
　calculating a first prediction value for the next time-point sensor fusion target information after the current point of measurement time t based on the received learning information.

10. The sensor fusion target prediction method according to claim 9, wherein the step of receiving learning information corresponding to each prediction item comprises receiving learning information acquired by accumulating and learning ten pieces of information measured from the current point of measurement time t to past points of measurement time t−1 to t−9.

11. The sensor fusion target prediction method according to claim 9, wherein the step of calculating the first prediction value further comprises, upon calculating the first prediction value of the next point of measurement time t+1 after the current point of measurement time t, calculating a second prediction value for a next-next time-point sensor fusion target information based on the calculated first prediction value and learning information corresponding to the first prediction value.

12. The sensor fusion target prediction method according to claim 11, wherein the learning information corresponding to the first prediction value is learning information comprising nine pieces of information measured from the current point of measurement time t to past points of measurement time t−1 to t−8.

13. The sensor fusion target prediction method according to claim 11, wherein the step of calculating the second prediction value comprises calculating the second prediction value based on not receiving the current next-next time point sensor fusion target information after calculating the first prediction value.

14. The sensor fusion target prediction method according to claim 11, wherein the step of calculating the second prediction value comprises calculating the second prediction value based on not continuously receiving the current sensor fusion target information and the next-next time-point sensor fusion target information after the current point of measurement time t.

* * * * *